United States Patent [19]

Matsuda et al.

[11] Patent Number: 4,673,580
[45] Date of Patent: Jun. 16, 1987

[54] PROCESS FOR PRODUCING COFFEE EXTRACT

[75] Inventors: Osamu Matsuda; Sadaji Danno, both of Suzuka, Japan

[73] Assignee: Ajinomoto General Foods, Inc., Tokyo, Japan

[21] Appl. No.: 710,333

[22] Filed: Mar. 11, 1985

Related U.S. Application Data

[63] Continuation-in-part of Ser. No. 497,315, May 23, 1983, abandoned.

[51] Int. Cl.4 ............................ A23F 5/26; A23F 5/30
[52] U.S. Cl. .................................... 426/385; 426/387; 426/434
[58] Field of Search ............... 426/594, 595, 432, 433, 426/434, 384–385, 387, 386

[56] References Cited

U.S. PATENT DOCUMENTS

| 2,410,157 | 10/1984 | Fredrickson | 426/432 |
| 3,656,964 | 4/1972 | Mansky et al. | 426/432 |
| 3,790,689 | 2/1974 | Pitchon et al. | 426/434 |
| 3,810,766 | 5/1974 | Holzberg | 426/386 |
| 3,965,269 | 6/1976 | Lee et al. | 426/434 |

Primary Examiner—Raymond N. Jones
Assistant Examiner—Marianne M. Cintins
Attorney, Agent, or Firm—J. T. Harcarik; T. R. Savoie; D. J. Donovan

[57] ABSTRACT

Coffee extracts are processed in a continuous countercurrent process of split extraction to obtain (1) atmospheric solids, (2) a push-out of low concentration, mainly atmospheric solids and (3) autoclave solids. Each stream can be further processed separately before recombining to achieve desired flavor characteristics.

6 Claims, 1 Drawing Figure

CONCENTRATION CURVE OF EXTRACT IN PERCOLATION PROCESS

CONCENTRATION CURVE OF EXTRACT IN PERCOLATION PROCESS

PROCESS FOR PRODUCING COFFEE EXTRACT

This is a continuation-in-part of Ser. No. 497,315, filed May 23, 1983, now abandoned.

TECHNICAL FIELD

The present invention relates to a process for producing coffee extract. More particularly, the invention relates to a process for producing coffee extract that is further processed by spray-drying or freeze-drying into a high quality soluble coffee product.

BACKGROUND OF THE INVENTION

The conventional method for producing soluble coffee products is described in M. Sivetz, "Coffee Technology," wherein roasted and ground coffee is extracted with heated water by the countercurrent method in a percolator set usually consisting of five to eight extraction columns connected in series, and the resulting coffee extract is subjected to drying and other after-treatments. A cycle of extraction in this method starts at the extraction column filled with the most spent roasted and ground (R&G) coffee and ends at the column filled with the freshest coffee. Therefore, in the fresher stage column, the coffee solids are extracted with a liquid that has a certain concentration of soluble coffee solids. As noted by Sivetz, the initial stage of extraction is performed by osmosis, so the efficiency of extraction depends on the difference between the solids content of the coffee cells and the concentration of the liquor to be extracted. Since the extraction liquid usually contains a larger amount of soluble solids, it is readily understood that the efficiency of extraction is decreased toward the progressively fresher stage columns.

As is well known, the aromatic components of coffee are susceptible to heat damage and are desirably extracted and processed at low temperatures. In other words, the desired coffee extract is obtained with high efficiency by extracting a fresh column in the initial stage with a liquor having a minimum content of soluble coffee solids.

To achieve this object, the prior art has relied on split extraction using a percolator set generally consisting of five to eight extraction columns. Split extraction consists of primary extraction wherein a column filled with freshly roasted and ground coffee and one or two subsequent columns are extracted with fresh water initially containing no soluble solids, and secondary extraction wherein the columns that have gone through the primary extraction step are subjected to secondary countercurrent extraction by feeding the most spent column with heated water. In the primary extraction, the fresher column is extracted at a relatively low temperature (e.g., 80°–150° C.) to minimize the damage to the aromatic components by heat, whereas in the secondary extraction, most of the columns are fed with high-temperature water (e.g., 160°–90° C). Therefore, the split extraction uses two, rather than one, water lines.

The advantages of split extraction have been recognized in many prior patents (e.g., U.S. Pat. Nos. 3,790,689, 3,810,766 and 3,965,269) and coffee makers have made efforts to use the process on a commercial scale. But their efforts have been hampered by the difficulty of achieving consistent operation in the overall process due mainly to the low concentration of draw obtained in the initial stage of the secondary extraction. Since the fresher column is desirably extracted at low temperatures, the extract obtained in the later stage of the primary extraction generally has a low concentration of soluble coffee solids. The effluent initially obtained in the secondary extraction is mainly composed of the residue from the primary extraction. To eliminate any void in an extraction column filled with roasted and ground coffee, water weighing about 1.5 to 2.0 times as much as the coffee is generally necessary. In other words, a true secondary extraction cannot start in the column unless water weighing about 1.5 to 2.0 times as much as the coffee is "pushed out" of it. The concentration of the secondary extract including the "pushed out" initial draw varies with the volume of the liquor to be extracted, but is generally in the range of from about 3 to 8% by weight coffee solids. In order to increase this concentration to the generally desired level, 80 to 90% of the water must be removed. To remove that much water by, say, thermal concentration, at least 8 to 10 kcal of heat is necessary per gram of soluble coffee solids, and the coffee solids undergo "heat damage" that adversely affects the quality of the final product. U.S. Pat. No. 3,810,766 to Holzberg recycles secondary extract the secondary extraction columns to increase the concentration of the secondary extract. Nonetheless, it is apparent that an advance in the art is needed to more effectively extract the coffee solids and preserve the quality of the coffee solids to the final product.

SUMMARY OF THE INVENTION

It has been found according to the present invention that a high quality coffee extract is produced by separating the secondary extraction effluent into two portions, an initial draw of a relatively low soluble solids concentration and a subsequent draw that has a higher solids concentration. The process initially consists of separating the processes of primary extraction, i.e., atmospheric solubilization, and secondary extraction, i.e., superatmospheric (autoclave) solubilization. Furthermore, those atmospheric solids carried into the autoclaving portion of the process are collected separately from those coffee solids generated during secondary or autoclave extraction, that is the atmospherically generated coffee solids are "pushed out" of the secondary extraction zone prior to being subjected to higher temperatures. In addition to these separate collections, different treatments may be applied to retain desirable and remove undesirable flavor notes. Thus, the atmospheric draw can be freeze concentrated to preserve all its flavor/aroma characteristics and the "pushed out" atmospheric split of the autoclave draw can be thermally concentrated, combined with the extract from the second part of the autoclaving section containing essentially superatmospherically generated solubles, and the combination may then be stripped of aromatics that may be retained and readded prior to drying. The process has been found to markedly improve the flavor of soluble coffee while maintaining normally economic yields and productivity.

The problem of degradation of good flavor/aroma atmospherically derived components is not encountered in the process of the present invention as in standard processes where a significant portion is subjected to excessive temperatures or is combined with and thereby not distinguished from autoclave generated components.

The process has thus been found to provide improved operation at economically attractive yields and productivities.

As a result, a coffee extract having a higher level of aromatics and soluble solids may be obtained so as to obtain a final soluble coffee product having flavors characterized as stronger, richer and more like a roasted and ground (R&G) coffee brew.

DETAILED DESCRIPTION OF THE INVENTION

Figure 1:
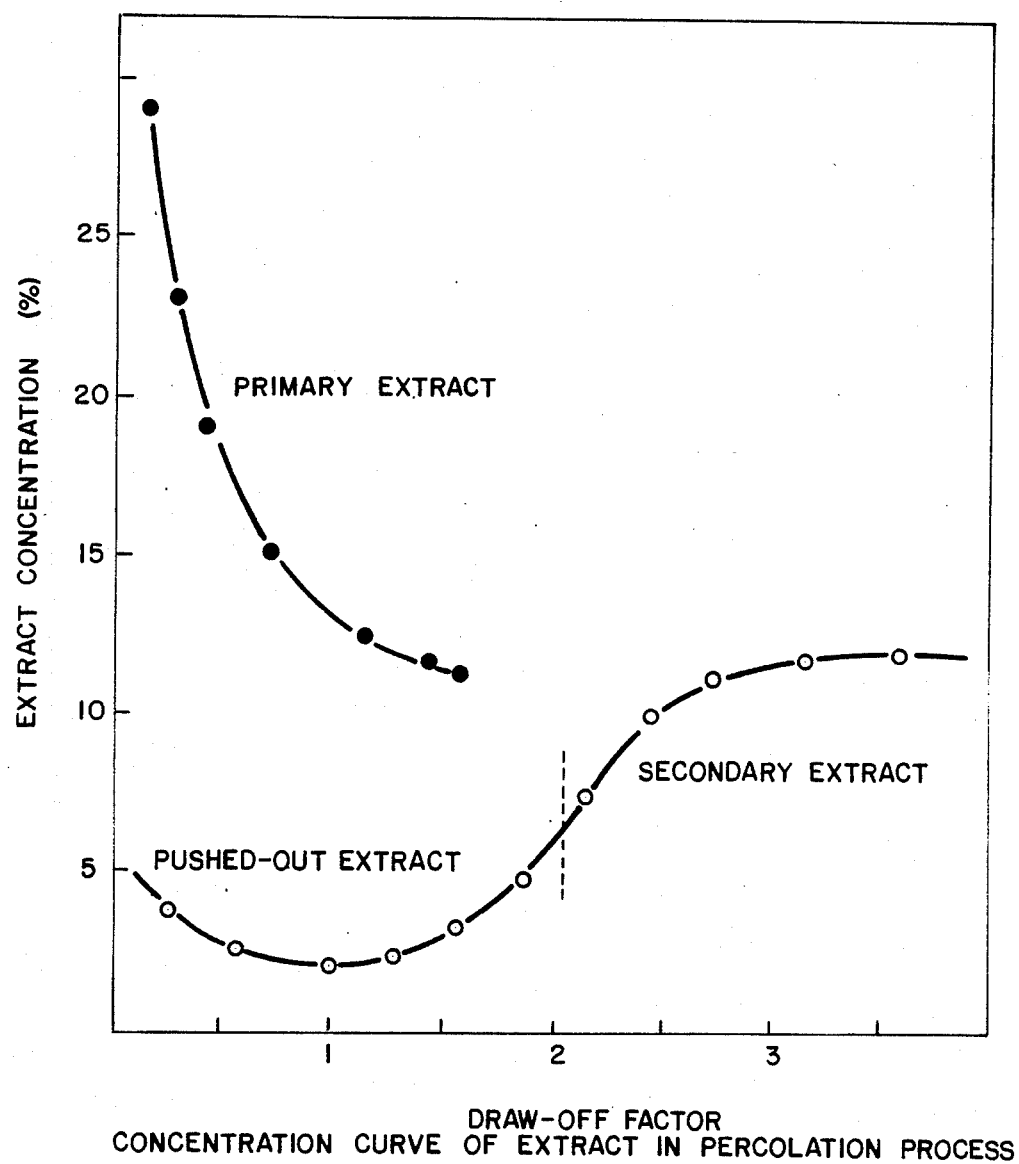

According to the present invention, water heated to between about 100° and 145° C. is fed to the primary extraction zone, and water heated to about 160° and 190° C., preferably between 170° and 185° C., is fed to the secondary extraction zone. The primary extraction zone consists of at least two, preferably two or three, columns at any instant in time. If the primary extraction zone consists of two columns, the primary extract (having passed through the two columns) is drawn off until its weight is about 1.5 to 2.0 times as much as the R&G coffee loaded in one column. Subsequently, fresh water is supplied to the second column, and the resulting extract is supplied to a third column filled with fresh R&G coffee, said third column acting as the second extraction column for the "subsequent" fresh water feed. Extract weighing about 1.5 to 2.0 times as much as the R&G coffee load is drawn off the third column. Thereafter, fresh water is fed to the third column, then into a fourth column and drawn off, and so on in this manner through a battery of extraction columns. As each column goes through the primary extraction, it is added to a series of columns for secondary extraction and is used as the freshest column from which the secondary extract is drawn off.

The secondary extraction zone consists of at least three, preferably three to five, columns, each of which has gone through primary extraction as previously described. When three columns are used, heated fresh water at a temperature of about 160° to 190° C. is supplied to the most spent or extracted column (first column) and an "initial draw" weighing about 1.5 to 2.0 times as much as the R&G coffee loaded in one column is drawn off the freshest column (third column). It is to be recognized that the initial draw is the extract residual from the column last extracted in the primary extraction zone, and its solids content is low, say between about 2 to 4% by weight. After drawing off the initial draw, a subsequent draw of extract weighing about 1.0 to 2.0 times as much as the R&G coffee loaded in one column is drawn off into a separate vessel. The concentration of the subsequent draw is generally about 5 to 12% by weight, typically about 8 to 10%. After the initial and subsequent draws are completed, the most spent (first column) is removed from the secondary extraction zone and a fourth column is added to the end of the secondary extraction zone as the freshest column.

Thus, according to the present invention, three separate extract streams are generated, primary extract and initial and subsequent draws from the secondary extraction zone. A primary advantage of the invention is that the handling of these extracts may be carefully tailored to the quality and level of coffee aromatics contained therein, thereby enabling the production of a soluble coffee product rich in roasted and ground coffee flavors. More specifically, the primary extract is very rich in high quality coffee aromas and is preferably freeze-concentrated to best retain its aromatic quality and integrity. The initial and subsequent draws contain less coffee aromatics and compared to one another, they contain a different level and quality of coffee aromatics. The processing of these two draws is critical to the production of a high quality soluble coffee.

As stated above, the solids content of the initial draw is from about 2 to 4%, and that of the subsequent draw is from about 5 to 12%. It has been found that the subsequent draw with its relatively high coffee solids concentration, contains flavorful coffee aromas which are desirably stripped from the extract and then returned to the extract stream prior to drying. Since the volume of the initial draw is small and its solids content is relatively low, it can be concentrated by application of heat and combined with the subsequent draw without causing a significant adverse effect on its quality. Thus, in a preferred embodiment of the invention, the initial draw is concentrated to about 25% to 55% coffee solids by weight, combined with the subsequent draw, and then the combined stream is stripped of coffee aromas, as for example, by the processes described in U.S. Pat. Nos. 4,107,339 and 4,281,023, hereby incorporated by reference. The combined stream may then be further concentrated to about 35% to about 55% by weight coffee solids, and it may then be added to the concentrated primary extract. The stripped aromas may be added back to any of the concentrated coffee extract streams or to the primary extract prior to its being concentrated.

Thereafter, the stream may be dried as for example by spray-drying or freeze-drying. The profile of coffee solids concentration in each step of the process of the present invention is depicted in FIG. 1.

Samples of soluble coffee were prepared by the process of the present invention and palatability was compared in organoleptic tests (conducted, and participated in, by trained panelists) with coffee samples prepared by a conventional split extraction method. The coffee product prepared from the extract of the present invention was judged more rich in flavor and body than the conventional soluble product and had many characteristics of "regular coffee" brewed from roasted and ground coffee beans. The most significant feature was that the product of the present invention had a pleasingly titratable acidity and yet had high pH. The acidity-forming acid gave body to the coffee, making it a mellow product with good mouthfeel.

BEST MODE FOR CARRYING OUT THE INVENTION

The present invention is now described in more detail by reference to the following example.

EXAMPLE

Coffee roasted by a conventional method were ground to such a degree that particles coarser than 8 mesh accounted for 45 to 75% of the total weight and the ground coffee was loaded in the first of the columns for primary extraction. The first column was initially fed with water heated to 145° C. The second column was filled with similarly roasted and ground coffee beans, and was fed with the draw from the first column. An extract weighing about 1.5 times as much as the coffee load was drawn off the second column. Then, fresh water heated to 145° C. was supplied to the second column, and the draw from the column was supplied to a third column that had been filled with freshly roasted and ground coffee beans. An extract weighing about 1.5 times as much as the coffee load was drawn off the third column, which was then fed with fresh water heated to 145° C. The subsequent columns were subjected to the primary extraction by the same procedure.

The columns that went through the primary extraction were then subjected to secondary extraction. The first column was fed with heated water (ca. 180° C.) by means of a pump different from that used for the primary extraction, and the resulting extract was directed to the second column. The extract from the second column was further directed to the third column, and the resulting extract was drawn off the third column. Therefore, the secondary extraction was carried out with three columns connected in series. An initial draw weighing about 2.1 times as much as the coffee load was drawn off from the third column, and a subsequent extract weighing about 1.5 times as much as the coffee load was further drawn off. The initial draw was of lower concentration (3.5% solids) and after concentration in an evaporator by heat, was combined with the subsequent extract (8.3% solids) for further processing. The combined extract was stripped of aromas and then concentrated in an evaporator by heat into a coffee extract having the desired concentration (38.3% solids). The previously obtained primary extract (18.0% solids) after addition of the stripped aromas rich in flavor was freeze-concentrated into a flavorful, highly concentrated coffee extract. The two concentrated coffee extracts were combined and freeze-dried into a high quality flavorful instant coffee having flavor notes characterized as stronger, richer and more R&G-like than a conventional soluble coffee.

We claim:

1. In a continuous countercurrent process for producing a high quality coffee extract by split extraction consisting of a primary extraction zone wherein water having a relatively low temperature of about 100° C. to about 145° C. is fed to two or more columns, each loaded with fresh roasted and ground coffee beans to produce a primary extract and a secondary extraction zone wherein water having a relatively high temperature of about 160° C. to about 190° C. is fed to three or more columns that have been subjected to said primary extraction, the improvement which comprises:
    (a) removing an initial draw from said secondary extraction zone having a low soluble coffee solids level of about 2% to about 4% by weight and a flavor quality approaching that of the extract produced in the primary extraction, said initial draw consisting of the residual extract from the primary extraction;
    (b) removing separately a subsequent draw from said secondary extraction zone having a high soluble coffee solids content of about 5% to about 12% by weight and a lower flavor quality than said initial draw;
    (c) concentrating the initial draw of step (a);
    (d) combining the concentrated initial draw with the subsequent draw of step (b);
    (e) stripping said combination of flavorful coffee aromatics and then further concentrating said combination; and
    (f) mixing said concentrated combination with the primary extract and the flavorful coffee aromatics of step (e).

2. The process of claim 1 further comprising drying the mixture of step (f) to produce a soluble coffee product.

3. The process of claim 2 wherein said drying is accomplished by freeze drying.

4. The process of claim 3 wherein said initial draw comprises about 1.5 to 2.0 times the roasted and ground coffee load in a single column by weight.

5. The process of claim 3 wherein said subsequent draw comprises about 1.0 to 2.0 times the roasted and ground coffee load in a single column by weight.

6. The process of claim 3 further comprising stripping the primary extract of step (f) of flavorful aromatics, concentrating said primary extract, and then adding back the stripped flavorful aromatics before mixing as in step (f).

* * * * *